United States Patent [19]

Zavoda

[11] 4,375,182

[45] Mar. 1, 1983

[54] ULTRA-SENSITIVE DIAPHRAGM WITH DUAL STRESS-RELIEF STRUCTURES

[76] Inventor: John R. Zavoda, 5245 Darrow Rd., Hudson, Ohio 44236

[21] Appl. No.: 202,469

[22] Filed: Oct. 31, 1980

[51] Int. Cl.³ .............................................. F16J 3/02
[52] U.S. Cl. ................................. 92/98 R; 92/102; 92/103 M; 92/104
[58] Field of Search ................ 92/96, 98 R, 102, 104, 92/103 M

[56] References Cited

U.S. PATENT DOCUMENTS

| | | | |
|---|---|---|---|
| 128,452 | 7/1872 | Anderson | 92/101 |
| 1,549,072 | 8/1925 | Dole | 92/102 |
| 1,793,621 | 2/1931 | Kelley | 92/104 |
| 2,786,423 | 3/1957 | Coffey | 92/102 |
| 2,874,569 | 2/1959 | Gray | 73/279 |
| 2,913,008 | 11/1959 | Cordero | 92/104 |
| 3,079,953 | 3/1963 | Mounteer | 92/104 |
| 3,187,641 | 6/1965 | Bowditch | 92/94 |
| 3,340,734 | 9/1967 | St. Clair | 73/279 |
| 3,645,139 | 2/1972 | Zavoda | 73/715 |

FOREIGN PATENT DOCUMENTS

| | | | |
|---|---|---|---|
| 847073 | 8/1952 | Fed. Rep. of Germany | 92/104 |
| 579289 | 7/1946 | United Kingdom | 92/104 |
| 749551 | 5/1956 | United Kingdom | 92/104 |

*Primary Examiner*—Abraham Hershkovitz
*Attorney, Agent, or Firm*—Isler and Ornstein

[57] ABSTRACT

A discal diaphragm body with a plurality of radially stress-relieving full-wave annular corrugations and a plurality of circumferentially stress-relieving full-wave radial spokes. The spokes follow and conform to the annular corrugations and are integrated with them to provide dual stress-relief and enhanced sensitivity for a pressure-responsive diaphragm.

14 Claims, 7 Drawing Figures

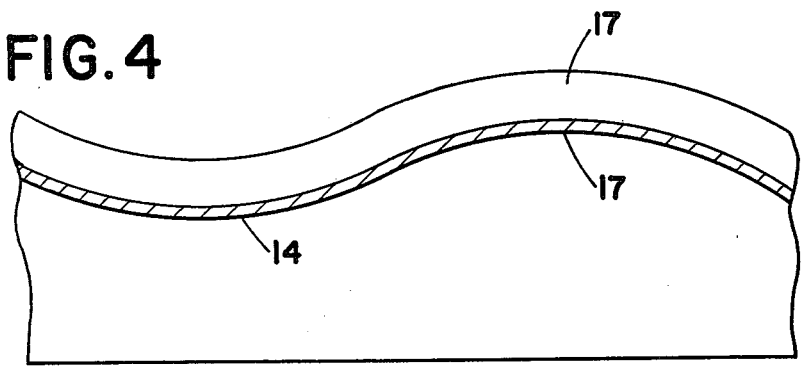
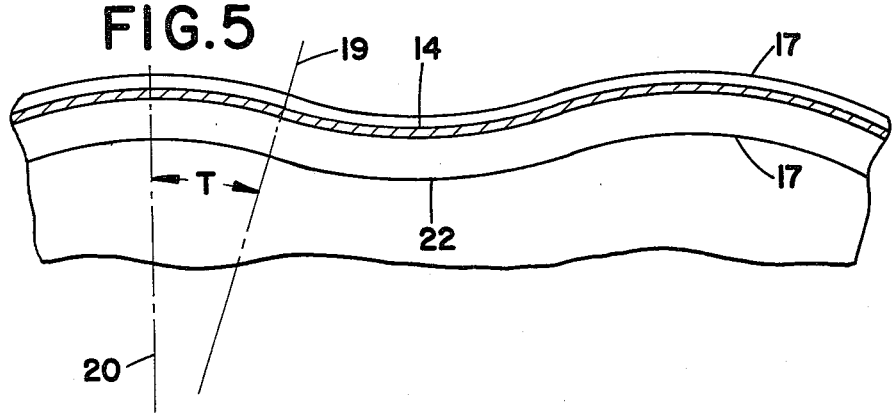
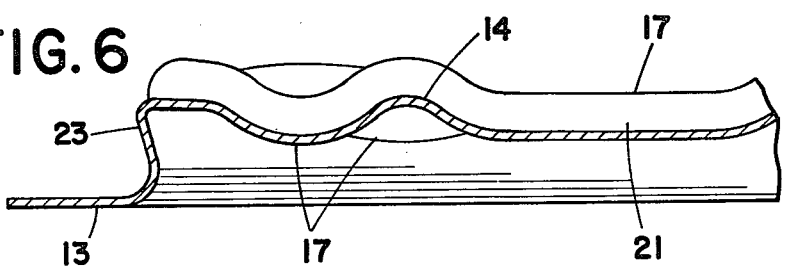
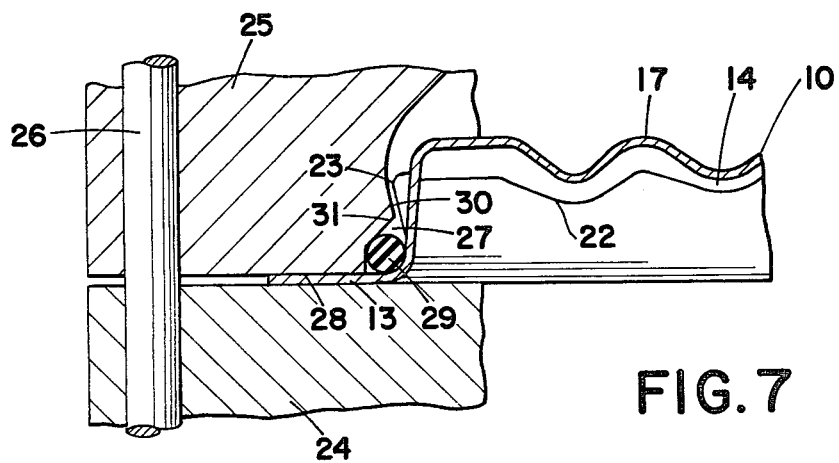

ULTRA-SENSITIVE DIAPHRAGM WITH DUAL STRESS-RELIEF STRUCTURES

BACKGROUND OF THE INVENTION

A wide variety of industrial instruments have been developed using flexible metal or non-metallic diaphragms for diverse purposes. A common such use is in the measurement of process fluid pressures, where the diaphragm is a seal that serves to isolate the process fluid from the instrument fluid and pressure instrument mechanism while simultaneously sensing and transmitting the fluid pressure to the sensing element of the pressure instrument.

In designing such pressure-responsive diaphragms, two generally incompatible characteristics are sought to be maximized—sensitivity and durability. Sensitivity—as measured by the force or pressure necessary to temporarily deform or deflect the diaphragm—directly affects the accuracy of the pressure measurement. Durability affects both accuracy and practicality; if the diaphragm lacks durability, it can become permanently deformed, causing inaccuracy or rupture, causing damage to the recording mechanism. The less durable a diaphragm is, the more often it must be replaced, causing costly and undesirable "down time".

Increased durability is achieved at the expense of sensitivity. To achieve accuracy coupled with durability, diaphragm designers have focused on structures whose effective surface area remains substantially constant over a moderately wide range of deflection and whose surfaces contain corrugations or convolutions to permit deflection of the diaphragm with minimal stress on the diaphragm fibers. The diaphragm material must, of course, be thin enough to flex easily, yet thick enough to resist corrosion and permanent deformation or rupture. When made of metal, a diaphragm for a pressure recording instrument is typically 0.004 to 0.005 inches thick and about 2 to 4 inches in diameter.

Whatever the exact thickness or composition of the diaphragm material, a flat diaphragm is subject to two distinct types of tensile stress as the diaphragm is deflected under pressure. One of these is radial stress; the other is circumferential stress (commonly called "hoop stress"). These stresses occur because, as pressure is applied to one side of a flexible diaphragm, the diaphragm will flex—or "dome out"—in the opposite direction, thereby assuming a convex or parabolic profile. The diaphragm material will be stretched both along its diameter (radial stress) and circumferentially. It is evident that the surface area of the diaphragm in its domed position is greater than the surface area of the diaphragm in its rest position. This enlargement of the diaphragm surface stretches the diaphragm fibers circumferentially, thereby creating "hoop stress".

The prior art has dealt with *radial* stress by shaping *annular corrugations* into the diaphragm structure, as shown in Mounteer, U.S. Pat. No. 3,079,953 and Zavoda, U.S. Pat. No. 3,645,139. These corrugations, or convolutions, are concentric with the circumference of the diaphragm and facilitate the radial displacement of the diaphragm material by providing additional material that is predisposed to bending in a radial direction.

As in Anderson, U.S. Pat. No. 128,452 and St. Clair et al., U.S. Pat. No. 3,340,734, the prior art has reduced "*hoop stress*" by shaping radially extending ribs or "spokes" into the diaphragm structure. These spokes facilitate the circumferential flexing of the diaphragm by providing additional material that is predisposed to bending in a circumferential direction (i.e., in a direction generally perpendicular to the radius).

Although a "herring bone" design was made known to the art by Gray, U.S. Pat. No. 2,874,569, prior designers have failed to reduce *both* radial stress and circumferential stress with one design integrating multiple annular corrugations and spokes. This is because the spokes, or radial convolutions, have been constructed as *radial stiffening* elements that will offset or neutralize the radial flexing effects of the annular corrugations. An example of this is Mounteer, U.S. Pat. No. 3,079,953. Moreover, prior structures have been limited to single, rather than multiple, annular corrugations when the stiffening ribs or spokes are imposed on the annular corrugation. Examples include Kelley, U.S. Pat. No. 1,793,621 and Bowditch, U.S. Pat. No. 3,187,641. Such a single corrugation, which is trough-shaped rather than wave-shaped, is obviously adaptable to ribbing, but only facilitates diaphragm movement over a narrower range and with less sensitivity of response than would be possible using wave-shaped (multiple) corrugations. In effect, the distortion of the preformed trough introduces a compressive stress as the diaphragm is already "domed out" in a predetermined direction, in contrast to the tensile stresses resulting from displacement of the discal or planar form of diaphragm.

SUMMARY OF THE INVENTION

It is a primary object of the invention to overcome both the limitations of a trough-shaped annular corrugation and the stiffening-neutralizing effect of spokes by means of a novel diaphragm structure that melds a plurality of radially extending corrugations with multiple annular corrugations in an integrated structure that retains, rather than disrupts, the annular wave-form configuration—and thereby substantially increases diaphragm sensitivity and durability through the simultaneous reduction of radial and circumferential tensile stresses.

Another object of the invention is to provide a structure of the character described in which the forming of the radially extending corrugations provides peripheral projections for securement of the diaphragm in the instrument flange.

BRIEF DESCRIPTION OF THE DRAWING

FIG. 4 is an enlarged arcuate cross-sectional view, taken as indicated on line 4—4 of FIG. 1.

FIG. 5 is an enlarged arcuate cross-sectional view, taken as indicated on line 5—5 of FIG. 1.

FIG. 6 is an enlarged cross-sectional view, similar to FIG. 2, but showing a modified form of the invention.

FIG. 7 is a fragmentary cross-sectional view, similar to FIG. 2, showing the securement of the diaphragm in an instrument assembly.

DESCRIPTION OF THE PREFERRED EMBODIMENTS

Figure 1:
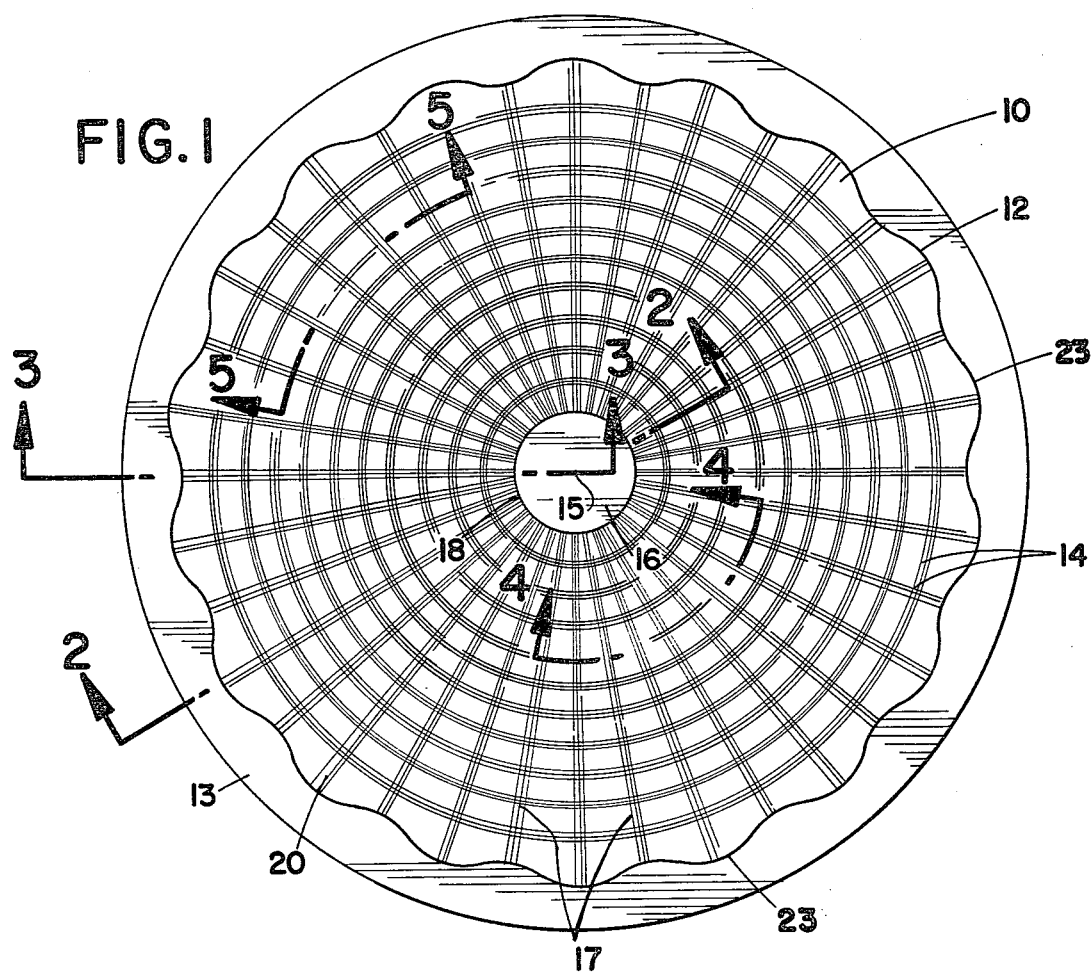
FIG. 1 is a top plan view of a diaphragm seal embodying the features of the invention.

Referring more particularly to FIGS. 1–5 of the drawing, there is shown a disc-like or discal diaphragm body 10 of circular configuration. The diaphragm is unitarily made or formed, by stamping, molding or other suitable means, from any suitable self-sustaining material, preferably metal. For purposes of practicality, the material of which the diaphragm is made should be thick enough to be durable and resist corrosion. However, it should be thin enough to provide the necessary characteristics or flexibility, without fracture, which are required in a substantially planar diaphragm intended for use as a seal in association with pressure-responsive instruments. By way of example, a nominal metal thickness of approximately 0.005 inches of metal material will customarily be satisfactory, although variations from this nominal thickness dimension in one direction or another are possible.

A rim 11 depends from the periphery 12 of the discal body 10 and has extending outwardly therefrom a clamping flange 13 which is substantially parallel to the plane of the body 10, but offset therefrom.

Figure 2:
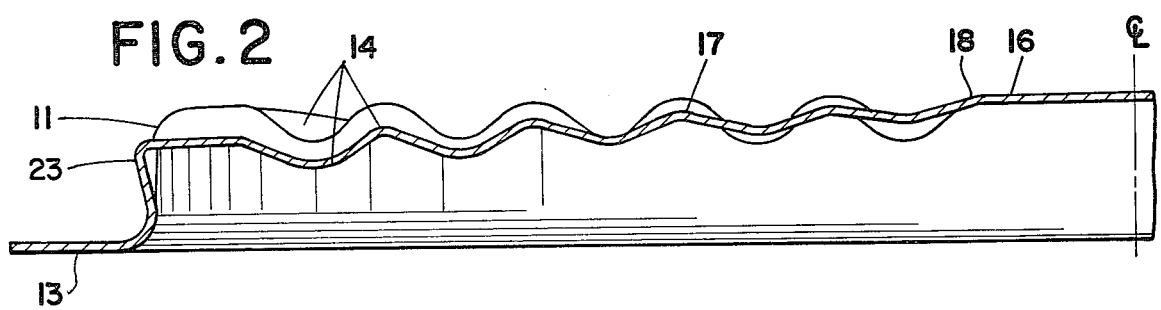
FIG. 2 is an enlarged cross-sectional view, taken as indicated on line 2—2 of FIG. 1.
Figure 3:
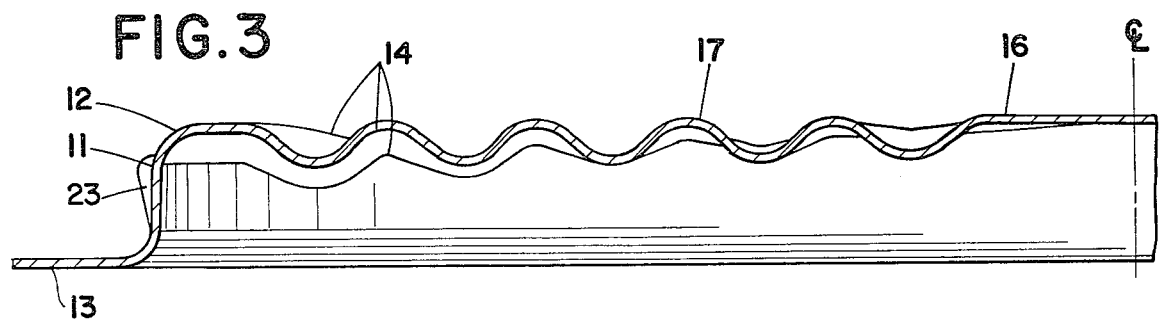
FIG. 3 is an enlarged cross-sectional view, taken as indicated on line 3—3 of FIG. 1.

As best shown in FIGS. 1, 2 and 3, the body 10 is provided with a plurality of annular corrugations 14 in a periodic waveform configuration, whereby each pair of corrugations represents a full periodic wave length. Thereby, one corrugation will extend in a direction upwardly from the nominal plane of the body 10, and its adjacent corrugation will extend downwardly from that plane to complete the periodic wave. As here shown, the annular corrugations 14 extend from a point closely adjacent the periphery 12 to a point closely adjacent the center 15 of the body, where a central hub 16 of suitable dimension is provided.

When the diaphragm is operative in an instrument assembly, any fluid pressure differential to which the diaphragm is exposed, will cause deflection or displacement of the diaphragm body 10 in one direction or the other, with the greatest axial deflection occurring at the central portion 16. This deflection of the diaphragm from a planar position of rest to a bowed or domed position of operation, causes a stretching of the diaphragm material, most of which is reflected in a radial tensile stress in the body 10. The function of the annular corrugations is to minimize this radial tensile stress by introducing bendable or yieldable portions into the diaphragm body, which will minimize the linear stretch of the fibers in the body. This reduction of radial tensile stress permits the diaphragm body to have greater flexibility under deflection load and thereby greater sensitivity of response within its total operating range.

In addition to the above-mentioned radial stress which is created by pressure-responsive deflection of the diaphragm body, the bowing or doming of the discal body also tends to create a circumferential tensile stress which, although perhaps not of as great a magnitude as the radial stress, is nevertheless a significant factor in reducing the flexibility and accuracy of response of a planar diaphragm. Both the radial and the circumferential tensile stresses are of their greatest magnitude in that area of the body 10 which is closest to the periphery 12, and progressively diminish toward the center 15 of the body.

The teachings of the prior art have been directed primarily to the reduction of the predominant radial stress by means of the annular corrugations. However, the introduction of annular corrugations to reduce radial stress has itself magnified the the problem of circumferential tensile stress. This results from the fact that the annular corrugations create a sectional deformation of the body 10 which, although easing radial tensile stress, act as stiffening ribs to reduce circumferential flexibility and increase circumferential stress in response to body deflection.

It is known to those skilled in the art that the greater the amplitude or depth of the annular corrugations, and the closer the corrugations are to each other, the greater the flexibility that can be achieved, within practicable limits. Thus, if the peak-to-peak dimension or wave length of these corrugations is compared to the depth or amplitude of these corrugations from peak-to-valley, a flexibility ratio can be established by dividing the amplitude by the wave length. The larger this ratio value is, the greater the radial stress-relieving function of the annular corrugations. However, such a large and apparently desirable flexibility ratio is, conversely, also indicative of increased stiffening and increased deflection stress in the body in a circumferential direction. This factor has generally compelled the prior art to compromise and settle for less than the desired radial flexibility which could be achieved by the annular corrugations, so as to avoid augmenting the hoop stress by a stiffening effect in a circumferential direction.

The present invention not only reduces the inherent hoop stress, but also obviates the compounding of the problem resulting from the imposition of the annular corrugations on the discal diaphragm. This is accomplished by utilizing a plurality of radially-extending spokes 17 in a circumferential periodic wave-form configuration which conforms to and is integral with the annular corrugations 14. The spokes 17 extend inwardly from the periphery 12 of the discal body and follow the peaks and valleys of the annular corrugations. By utilizing the spokes to relieve circumferential tensile stress similarly to the manner in which the annular corrugations relieve radial tensile stress in the diaphragm body, the circumferential stiffening effect which would otherwise be produced by annular corrugations having a relatively high flexibility ratio, is minimized, thereby permitting the use of any desired flexibility ratio for the annular corrugations without concern for the offsetting circumferential stiffening effect which would occur if the spokes were not utilized.

Inasmuch as the radial tensile stress in the domed body 10 is customarily of greater magnitude than the circumferential tensile stress, it is not necessary that the wave-form of the spokes 17 have as great a flexibility ratio as the flexibility ratio of the annular corrugations. In fact, to avoid undue stiffening of the body 10 in a radial direction by use of the spokes 17, the flexibility ratio of the spokes is preferably less than the flexibility ratio of the annular corrugations and, preferably the annular corrugation wave-form has a flexibility ratio at least twice as great as the flexibility ratio of the spoke wave-form.

In order to effectively accomplish their circumferential stress-relieving function, the spokes should extend radially of the body 10, from the periphery 12, for a distance or dimension equal to at least 50% of the radius of the body 10. Preferably, the spokes should extend radially from the periphery to the hub 16.

Furthermore, inasmuch as the circumferential stress of the domed body is greatest at the periphery and diminishes toward the center 15 of the body, it has been determined that the utilization of the spokes 17 is most effective when the wave-form of the spokes has its highest flexibility ratio in the zone adjacent the periphery 12. For this reason, the amplitude of the spokes is preferably greatest at the periphery and may progressively decrease in a direction toward the center of the body. Thus, in its preferred form, each spoke is a half-wave-form of somewhat semi-conical configuration, which extends from the periphery 12 of the body toward an apex or juncture 18. At its inward terminus the spoke closely approaches a wave-form of substantially negligible amplitude and wave length, such as shown in the drawings at a juncture adjacent the hub 16. This semi-conical form of spoke 17 is indicated in the arcuate sectional view of FIG. 4 of the drawings and the arcuate sectional view of FIG. 5 of the drawings, which show the progressive change in amplitude and wave length of the spoke at differing distances from the center point 15 of the diaphragm body. The spokes are most effective in a continuous, uninterrupted wave-form extending through 360° of the circumference of the body 10.

By way of example, one can consider a diaphragm body 10 having a nominal diameter of 2.546 inches and having a plurality of annular corrugations and a plurality of spokes conforming with the annular corrugations and constructed to have the following flexibility ratios adjacent the outer peripheral portion 12:

EXAMPLE 1

The annular corrugations have a peak-to-valley total amplitude of 0.0675 inches and a peak-to-peak wave length of 0.150 inches to provide an amplitude-to-wave length flexibility ratio of 0.45. A plurality of spokes extend 0.75 inches inwardly from the periphery and have a peak-to-valley amplitude of 0.05 inches and a peak-to-peak wave length of 0.40 inches, providing a flexibility ratio of 0.125. The flexibility ratio of the annular corrugations is 3.6 times greater than the flexibility ratio of the spokes, at the periphery.

EXAMPLE 2

Similarly, annular corrugations are provided having an amplitude of 0.075 inches and a wave length of 0.150 inches to provide a flexibility ratio of 0.5. The spokes extend radially inwardly from the periphery for 0.95 inches and have an amplitude of 0.05 inches and a wave length of 0.20 inches to provide a flexibility ratio of 0.25. The flexibility ratio of the annular corrugations is 2 times greater than the flexibility ratio of the spoke wave-form.

EXAMPLE 3

The wave-form of the annular corrugations has an amplitude of 0.08 inches and a wave length of 0.10 inches to provide a flexibility ratio of 0.80. The spokes extend radially for a distance of 1.125 inches and have an amplitude of 0.04 inches and a wave length of 0.25 inches to provide a flexibility ratio of 0.16. The annular corrugations have a flexibility ratio 5 times greater than the flexibility ratio of the spokes.

EXAMPLE 4

The annular corrugations have an amplitude of 0.075 inches and a wave length of 0.20 inches to provide a flexibility ratio of 0.375. The spokes extend radially for a distance of 1.05 inches and have an amplitude of 0.050 and a wave length of 0.50 inches to provide a flexibility ratio of 0.10. The flexibility ratio of the annular corrugations is 3.75 times greater than the flexibility ratio of the spokes.

In the foregoing examples, it will be understood that the flexibility ratio of the spoke wave form may remain constant or may decrease in a direction toward the center 15, and this is also true of the annular wave-form.

In all of the foregoing examples, the flexibility ratio of the annular corrugations is greater than the flexibility ratio to which the prior art has been restricted as a practical upper limit to avoid the consequences of undue circumferential stiffening and stress, in the absence of the conforming spoke wave-forms herein described. As indicated in the examples, with the utilization of the spoke wave-form, the flexibility ratio of the annular corrugations can be substantially greater than heretofore thought practical.

Additionally, regardless of whether or not the annular corrugations have an improved flexibility ratio, the introduction of the conforming spoke wave-form reduces energy losses in deflection of the diaphragm and thereby enhances operating sensitivity by substantially relieving the circumferential stress which operating deformation imposes on a planar diaphragm.

The spoke wave-form is further characterized by having a restricted slope or angle of tangency between adjacent half-waves, so as to minimize any stiffening effect or reduction of flexibility of the body 10 which might otherwise be created by the spokes. This restriction is defined by drawing a perpendicular to the point of tangency between adjacent half-waves. That perpendicular should define an included angle of less than 45° with respect to the nominal vertical center-line or vertical radius-line of the half-wave. This angle may be designated as the tangency angle, and is indicated by the reference character T in FIG. 5 of the drawing. The reference numeral 19 designates the projected perpendicular to the point of tangency. The reference numeral 20 designates the projected vertical center-line or radius of a spoke half-wave.

Adjacent annular corrugations define a full wave and the quantity or number of such corrugations which are to be utilized can be varied. In many instances, it is desirable that the periodic wave-form of the annular corrugations have a progressively decreasing amplitude toward the hub 16 of the body where both the radial and circumferential tensile stresses decrease. As shown in FIG. 6 of the drawing, the invention also contemplates an arrangement of annular corrugations in which an intermediate zone 21 of the body 10 can be free of the annular corrugations, although traversed by the spoke wave-form.

FIG. 7 of the drawing is illustrative of the manner in which the diaphragm can be mounted and secured for utilization in association with a pressure responsive instrument or device. The wave form of the spokes 17 is such that alternate spokes provide valleys 22 below the nominal plane of the discal body 10, intercepting and deforming the rim 11 to provide circumferentially-spaced projections or lips 23 which project radially outwardly of the rim, as indicated. As is known in the art, the diaphragm seal may be assembled by seating the clamping flange 13 on a process flange 24 and clamping it by means of an instrument flange 25 which is fastened to the process flange by means of spaced bolts 26.

The instrument flange is provided with an annular recess 27 inwardly of and closely adjacent to its clamping face 28 for the purpose of accommodating an O-ring 29 which serves as a seal when compressed in the assembly of the flanges 24 and 25. A second annular undercut or recess 30 is provided on the instrument flange 25 in alignment with the circumferentially spaced projections 23. In assembling the diaphragm seal, the projections 23, which diametrically represent a somewhat larger diameter than the adjacent portion of the instrument flange, are pressed yieldably past the smaller diameter portion 31 of the instrument flange 25, so as to snap into the recess 30 and retain the diaphragm in sealing engagement with the O-ring 29 which acts as a fluid seal to prevent leakage or seepage of instrument fill fluids out of the instrument cavity.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described the invention, I claim:

1. In a fluid pressure-responsive diaphragm, the combination of a discal body, a plurality of annular corrugations in said body in a radial periodic wave-form configuration to relieve radial tensile stress therein, and a plurality of radially-extending spokes in said body in a circumferential periodic wave-form configuration conforming to and integrated with the peaks and valleys of said annular corrugations to relieve circumferential tensile stress therein, each of said wave-forms modifying the other.

2. A combination as defined in claim 1, wherein said periodic wave-form of said spokes is circumferentially continuous.

3. A combination as defined in claim 1 or 2, wherein said periodic wave-form of said spokes has a progressively decreasing wave-length in a direction toward the center of said body.

4. A combination as defined in claim 1 or 2, wherein said periodic wave-form of said spokes has a progressively decreasing amplitude in a direction toward the center of said body.

5. A combination as defined in claim 1 or 2, wherein each of said spokes has a substantially semi-conical configuration whose wave-form has both its greatest amplitude and greatest wave-length adjacent the periphery of said body.

6. A combination as defined in claim 1 or 2, wherein the radial length of said spokes is at least equal to 50% of the radius of said discal body, and said spokes terminate at the periphery of said body.

7. A combination as defined in claim 1 or 2, wherein the tangency angle defined between adjacent half-waves of said spokes is less than 45°.

8. A combination as defined in claim 1, wherein the amplitude of each of said annular corrugations is uniform.

9. A combination as defined in claim 1, wherein the amplitude of said annular corrugations progressively decreases in a direction toward the center of said body.

10. A combination as defined in claim 1, including a rim depending from the periphery of said discal body in a direction substantially normal to said body.

11. A combination as defined in claim 10, wherein alternate spokes in said body extend to and displace said rim to provide marginal projections thereon adapted for effecting securement of said diaphragm in an instrument assembly.

12. A combination as defined in claim 10 or 11, including a clamping flange extending outwardly from said rim and adapted for sealing securement of said diaphragm in an instrument assembly.

13. A combination as defined in claim 1 or 2, wherein the wave-form of said spokes adjacent the periphery of said body has a flexibility ratio which is less than the flexibility ratio of the wave-form of said annular corrugations adjacent said periphery.

14. A combination as defined in claim 13, wherein the flexibility ratio of the wave-form of said annular corrugations is at least two times greater than the flexibility ratio of the wave-form of said spokes at their common areas of intersection.

* * * * *